US012583693B2

(12) United States Patent
Tayebi

(10) Patent No.: US 12,583,693 B2
(45) Date of Patent: Mar. 24, 2026

(54) SYSTEM AND A METHOD FOR TEMPORARY STORAGE AND OFFLOADING OF GRANULAR MATERIALS

(71) Applicant: Granfoss AS, Oslo (NO)

(72) Inventor: Davoud Tayebi, Oslo (NO)

(73) Assignee: GRANFOSS AS, Oslo (NO)

( * ) Notice: Subject to any disclaimer, the term of this patent is extended or adjusted under 35 U.S.C. 154(b) by 98 days.

(21) Appl. No.: 18/702,920

(22) PCT Filed: Oct. 19, 2022

(86) PCT No.: PCT/NO2022/050237
§ 371 (c)(1),
(2) Date: Apr. 19, 2024

(87) PCT Pub. No.: WO2023/068941
PCT Pub. Date: Apr. 27, 2023

(65) Prior Publication Data
US 2025/0122031 A1     Apr. 17, 2025

(30) Foreign Application Priority Data
Oct. 22, 2021     (NO) .................................... 20211273

(51) Int. Cl.
*B65G 53/26*     (2006.01)
*B65G 53/42*     (2006.01)
(Continued)

(52) U.S. Cl.
CPC ............. *B65G 53/26* (2013.01); *B65G 53/42* (2013.01); *B65G 53/60* (2013.01); *B65G 67/00* (2013.01);
(Continued)

(58) Field of Classification Search
CPC ........ B65G 53/26; B65G 53/42; B65G 53/60; B65D 88/542; B65D 88/72
(Continued)

(56) References Cited

U.S. PATENT DOCUMENTS

| | | | | | |
|---|---|---|---|---|---|
| 640,463 | A | * | 1/1900 | Gildea | ..................... F04F 5/464 |
| | | | | | 417/172 |
| 2,148,501 | A | * | 2/1939 | Rasor | ..................... B65G 53/42 |
| | | | | | 285/280 |

(Continued)

FOREIGN PATENT DOCUMENTS

| | | |
|---|---|---|
| CN | 201318177 Y | 9/2009 |
| JP | S581027 U | 1/1983 |

(Continued)

OTHER PUBLICATIONS

International Search Report issued in corresponding PCT Application No. PCT/NO2022/050237, mailed on Dec. 2, 2022.
(Continued)

*Primary Examiner* — Joseph A Dillon, Jr.
(74) *Attorney, Agent, or Firm* — Dilworth IP, LLC

(57) ABSTRACT
A system for temporary storage and offloading of granular materials is presented. The system comprises a tank for storage of a granular material and a suction head for off-loading granular material from the tank. The suction head comprises a lower end, an outlet for removing granular material from the suction head, and sidewalls, extending from the lower end to the outlet. The suction head further comprises at least one opening for the inflow of granular material into the suction head and one or more nozzles configured to emit a pressurized fluid. The one or more nozzles comprise one or more inner nozzles, configured to generate a helical flow within the suction head, and one or more outer nozzles, configured to generate a helical flow around the suction head in the same direction as the inner (Continued)

Figure 1A:
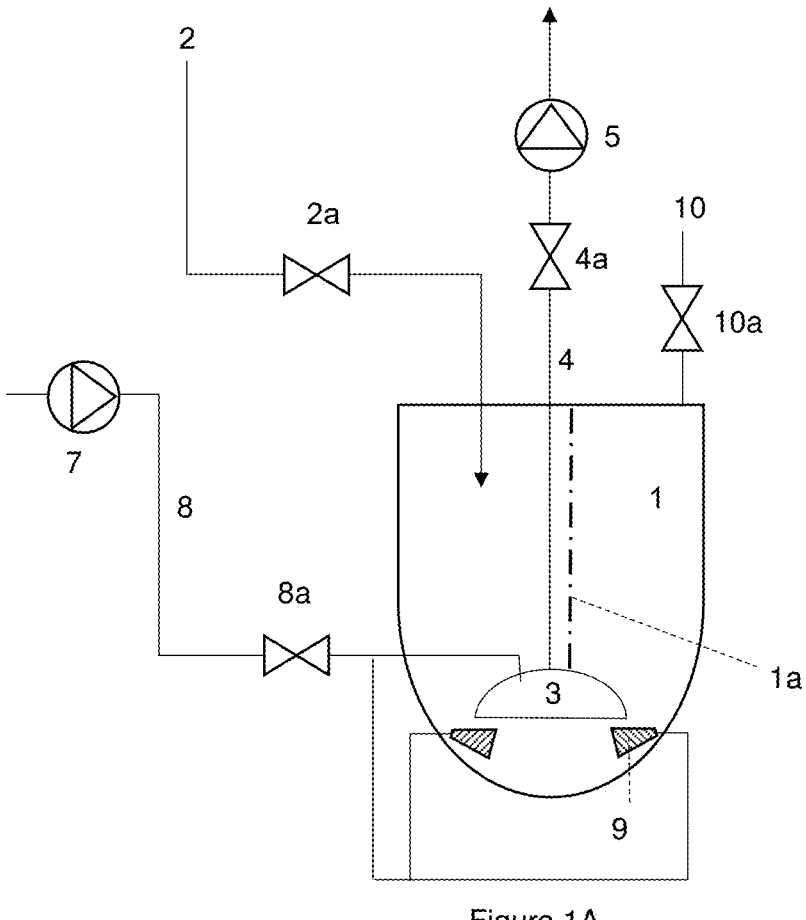

nozzles. Also presented is a method for storage and offloading of granular materials.

27 Claims, 6 Drawing Sheets

(51) Int. Cl.
B65G 53/60 (2006.01)
B65G 67/00 (2006.01)
(52) U.S. Cl.
CPC .................. *B65G 2201/042* (2013.01); *B65G 2812/1608* (2013.01)
(58) Field of Classification Search
USPC ................................ 406/137, 151–153, 173
See application file for complete search history.

(56) References Cited

U.S. PATENT DOCUMENTS

| | | | | | |
|---|---|---|---|---|---|
| 2,301,617 | A | * | 11/1942 | Cox | B65G 53/42 |
| | | | | | 406/152 |
| 2,783,098 | A | * | 2/1957 | Rooney | B65G 53/42 |
| | | | | | 406/52 |
| 2,874,999 | A | * | 2/1959 | Lofgren | B65G 53/20 |
| | | | | | 406/120 |
| 3,031,233 | A | * | 4/1962 | Pendleton | B65G 53/42 |
| | | | | | 406/151 |
| 3,121,593 | A | * | 2/1964 | Mcilvaine | B65G 53/22 |
| | | | | | 406/137 |
| 3,994,532 | A | * | 11/1976 | Hahn | B65G 53/42 |
| | | | | | 406/137 |
| 4,058,227 | A | * | 11/1977 | Shakshober | B65G 53/06 |
| | | | | | 406/65 |
| 4,098,412 | A | * | 7/1978 | Shakshober | B63B 27/24 |
| | | | | | 406/146 |
| 4,445,809 | A | * | 5/1984 | Schmitz | B65G 53/42 |
| | | | | | 406/152 |
| 5,037,246 | A | * | 8/1991 | Okano | B65G 53/42 |
| | | | | | 406/152 |
| 5,195,852 | A | * | 3/1993 | Malugani | B65G 53/42 |
| | | | | | 406/41 |
| 5,474,111 | A | * | 12/1995 | Williamson | B65G 53/26 |
| | | | | | 141/330 |
| 6,036,408 | A | * | 3/2000 | Wilhelm | B65G 53/24 |
| | | | | | 406/134 |
| 6,217,261 | B1 | * | 4/2001 | Santa Cruz | B65G 53/58 |
| | | | | | 406/134 |
| 7,395,618 | B2 | * | 7/2008 | Jacobsen | E02F 3/9262 |
| | | | | | 37/324 |
| 7,552,845 | B2 | * | 6/2009 | Guryevskiy | B65G 69/182 |
| | | | | | 222/88 |
| 10,239,712 | B2 | * | 3/2019 | Garcia | G01G 19/021 |
| 2009/0065431 | A1 | * | 3/2009 | Bakke | B01D 19/0094 |
| | | | | | 210/512.1 |
| 2018/0354732 | A1 | * | 12/2018 | Garcia | B65G 67/04 |
| 2024/0417952 | A1 | * | 12/2024 | Tayebi | E02F 3/9262 |

FOREIGN PATENT DOCUMENTS

| | | |
|---|---|---|
| JP | 2013082830 A | 5/2013 |
| WO | 2008046115 A2 | 4/2008 |
| WO | 2016080832 A1 | 5/2016 |

OTHER PUBLICATIONS

International Preliminary Report on Patentability issued in corresponding PCT Application No. PCT/NO2022/050237, mailed on Nov. 23, 2023.
Search Report issued in corresponding Norwegian Application No. 20211273, mailed on May 20, 2022.

* cited by examiner

SYSTEM AND A METHOD FOR TEMPORARY STORAGE AND OFFLOADING OF GRANULAR MATERIALS

TECHNICAL FIELD

The present invention concerns the temporary storage and offloading of granular materials. Specifically, the present invention concerns a system for temporary storage and offloading of granular materials and a corresponding method.

BACKGROUND

Granular materials arise in numerous industrial fields, such as chemical, pharmaceutical, or biological production processes, agriculture and food processing, mining operations, the oil and gas industry, or dredging or excavation operations. The particles of the granular material may comprise organic or inorganic matter, where particle diameters can range from a fraction of a micron up to several centimeters or more. The granular material may further comprise a fluid, such as air or water.

During processing or transport, the granular material may temporarily be stored in a storage space, such as a silo, a lorry, or an industrial vessel, such as an accumulator or a separator. Offloading from the storage space may be pressure-driven, by applying suction or a pressurized fluid, when gravity driven offloading is not feasible or desirable. Examples are, for instance, storage spaces in the hull of a ship, or granular materials where strong inter-particle cohesion may block gravity driven offloading.

A problem with the use of suction or a pressurized fluid for offloading, is that the applied suction or fluid pressure may be insufficient to overcome cohesive forces within the granular material. This may be especially problematic for densely packed particles or for particles prone to strong cohesive bonding. Consequently, the granular material may not be offloaded satisfactorily from the storage space, leading to accumulation of sedimented particles in the storage space and a reduction in storage capacity thereof. For certain granular materials such particle accumulations may adversely affect product qualities, or even lead to corrosion of the walls of the storage space itself. Furthermore, a moveable suction head may become partially or completely immobilized in the granular material. Consequently, both the mobility of the suction head and the capacity to remove granular material from the tank may be adversely affected.

Furthermore, it is a problem that the fluidization of the solid masses becomes to excessive on the outside of the suction head and that and that these solid masses not are sucked into the suction head but remains in the surrounding water.

Therefore, there is a clear need for an improved system and an improved method, wherein the risk of the applied suction being insufficient to overcome particle cohesion is reduced and wherein, furthermore, the risk of the suction head becoming partially or completely immobilized by being sucked into the granular material is reduced.

SUMMARY OF THE INVENTION

The present invention concerns a system for temporary storage and offloading of granular materials. The present invention also concerns a method for temporary storage and offloading of granular materials.

FIGURES

FIG. 1A schematically shows a system according to the present invention.

Figure 1B:
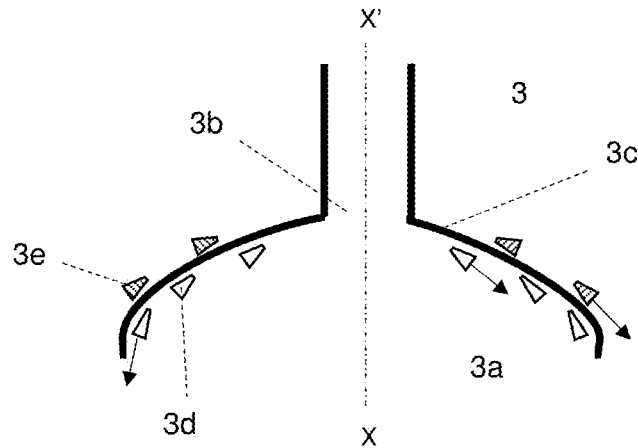

FIG. 1B schematically shows a detail of the system according to the invention in side-view cross-section.

Figure 1C:
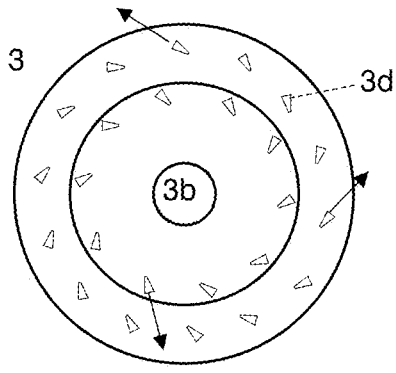

FIG. 1C schematically shows a detail of the system according to the invention in bottom view.

Figure 1D:
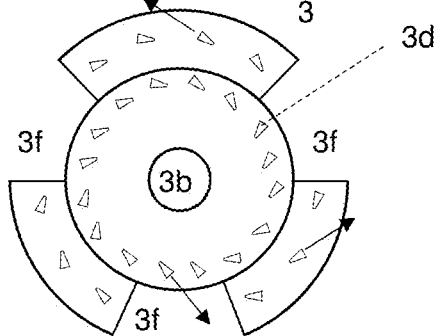

FIG. 1D schematically shows an alternative detail of the system according to the invention in bottom view.

Figure 1E:
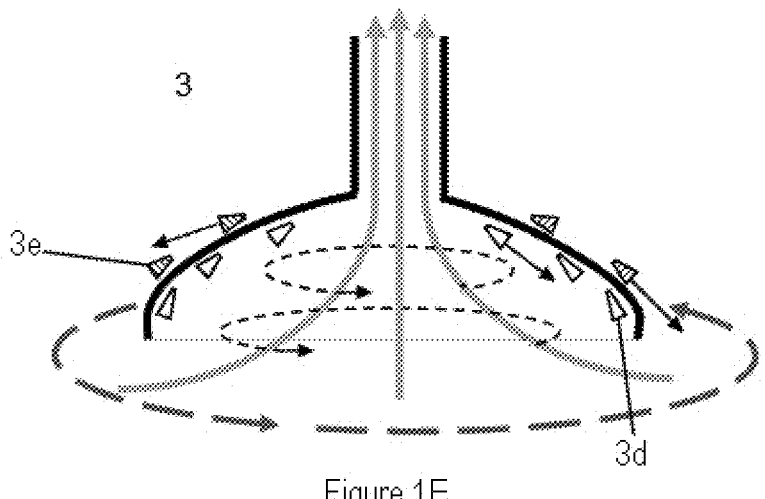

FIG. 1E schematically shows a detail of flow through the system according to the invention in side-view.

Figure 2A:
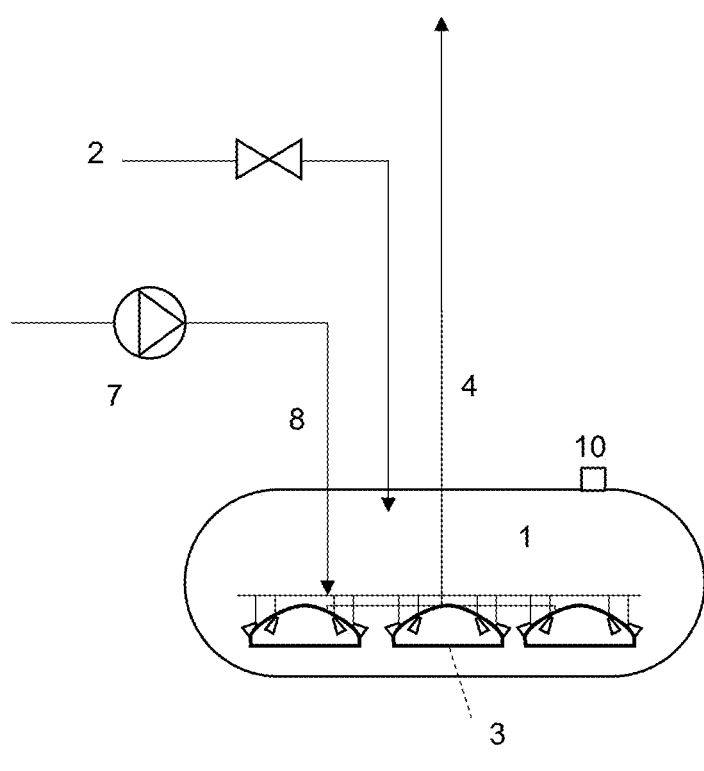

FIG. 2A schematically shows an alternative system according to the present invention.

Figure 2B:
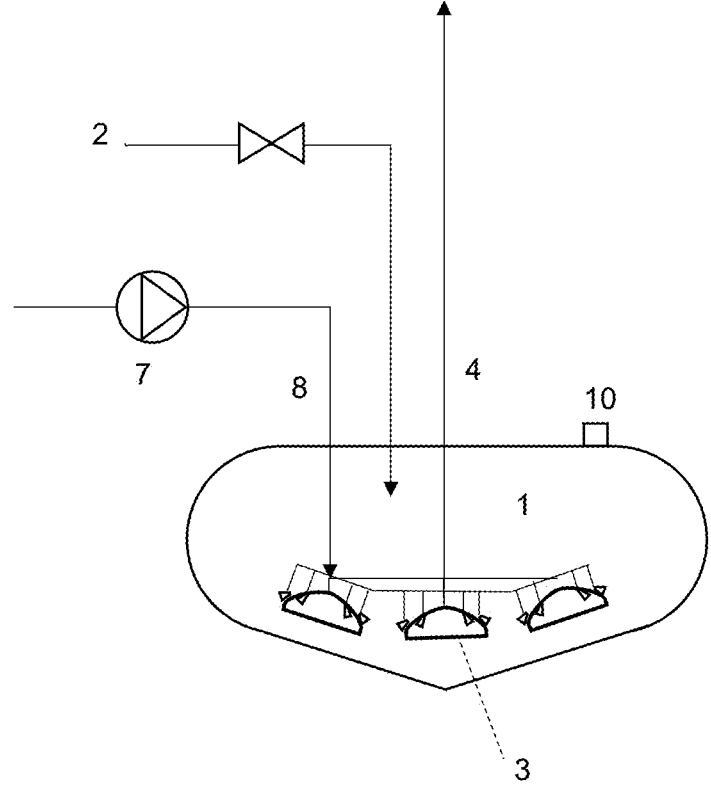

FIG. 2B schematically shows a further alternative system according to the present invention.

Figure 3A:
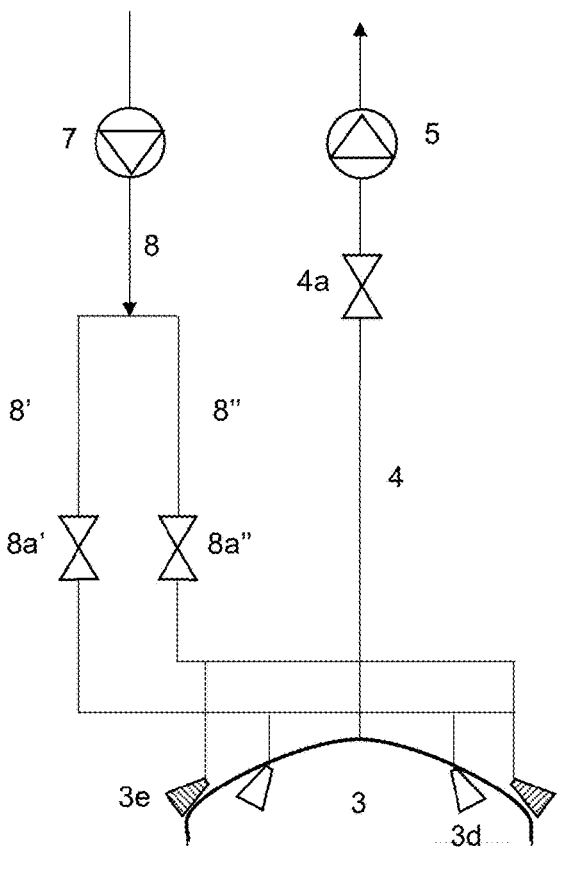

FIG. 3A schematically shows a first alternative flow configuration of a system according to the invention.

Figure 3B:
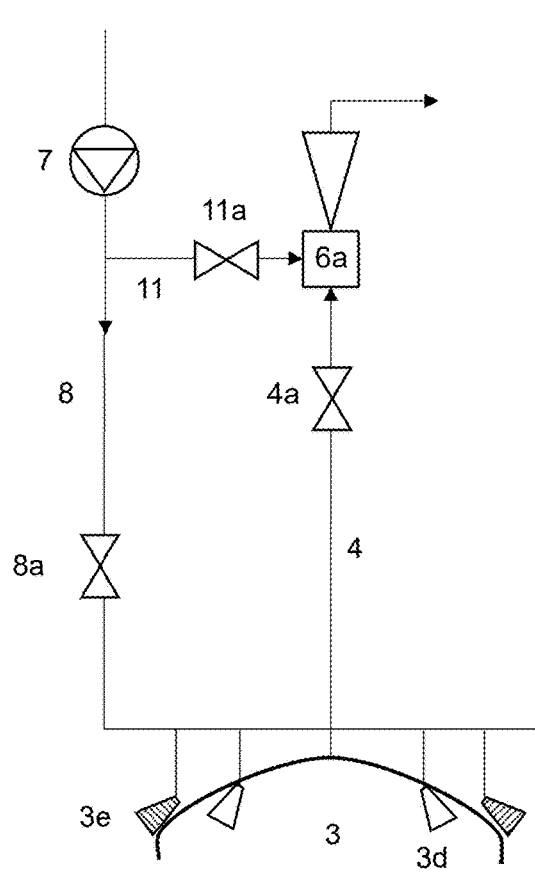

FIG. 3B schematically shows a second alternative flow configuration of a system according to the invention.

Figure 3C:
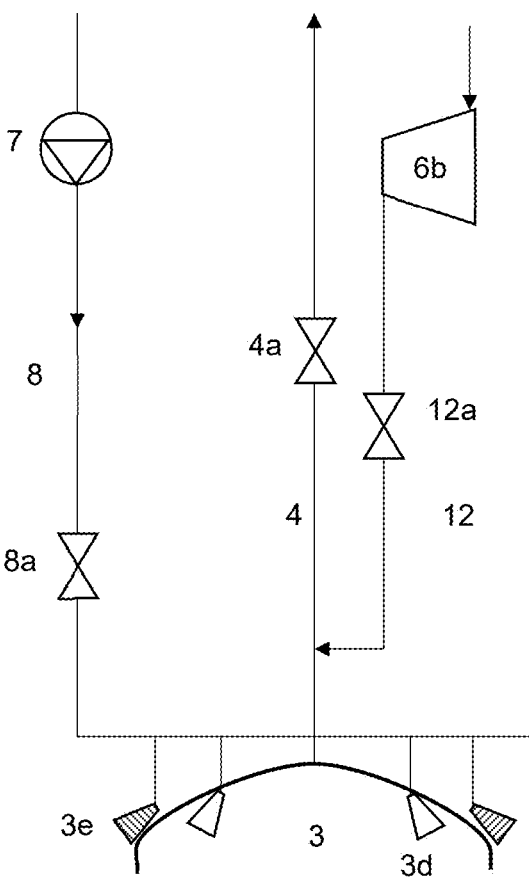

FIG. 3C schematically shows a third alternative flow configuration of a system according to the invention.

DETAILED DESCRIPTION

A system for the temporary storage and offloading of granular materials according to the invention is schematically shown in in FIG. 1A. The same reference signs denote the same features in FIG. 1A and all following figures. The system comprises a tank 1 for storage of a granular material. Exemplary granular materials comprise gravel, sand, silt, clay, metal, plastics, biomass, wood, food materials, ceramics, concrete, glass, minerals, crystalline materials, composites, or combinations thereof. The tank 1 may be placed on a ground surface, mounted on a fixed frame, or mounted on a moveable structure, such as a lorry, railway wagon or a vessel. The tank 1 may comprise a cylindrical tank, a conical tank, a spherical tank, or any other suitably shaped tank. Preferably, the tank 1 comprises a cylindrical tank. The longitudinal axis of the tank 1 may be oriented at an angle of 0-90° with respect to the surface on which the tank 1 is mounted. The angle is preferably about 0°, such that the tank 1 is horizontally oriented. Alternatively, the angle is preferably about 90°, such that the tank 1 is vertically oriented. The tank 1 may have a bottom formed such that the height in the middle of the tank is larger than the height at the sides of the tank. Preferably, the tank 1 has a conical bottom, a semi-spherical bottom, a semi-cylindrical bottom, or a V-shaped bottom. Alternatively, the tank 1 has a flat bottom. Advantageously, solid particles in the granular material thereby pile-up in the middle of the tank, due to gravity. Thereby, the particles of the granular material may be more easily collected during offloading. The top of the tank 1 may be open or closed. The tank 1 may comprise a metal material, such as aluminum or stainless steel, a polymer material, such as polypropylene or high-density polyethylene, or a composite material, such as a fiber-reinforced polymer, or concrete. The tank 1 may comprise a single-wall or a double-wall construction. Optionally, the tank 1 may be provided with insulation material. Further optionally, the tank 1 may be coated with a suitable coating, such as a wear resistant coating, an elastic coating, an anti-static coating, an anti-bacterial coating, an anti-fungal coating, an anti-magnetic coating, or an intumescent coating.

The system may comprise a supply pipe 2, for supplying granular material to the tank 1. The supply pipe 2 may comprise a control valve 2a, for controlling the flow of granular material. Alternatively, the system may comprise a hopper, a through, or a feed-screw for supplying granular material to the tank 1. Yet alternatively, the tank may comprise an open top and granular material may be fed into the tank from above, such as by a crane, or an excavator. The supply pipe 2 may be mounted to the top of the tank 1, to the side of the tank 1 or to the bottom of the tank 1.

The system comprises at least one suction head 3 (see FIGS. 1B and 1C), for offloading granular material from the tank 1 by suction. The suction head 3 includes a lower end 3a, and an outlet 3b. Suction is applied to the suction head 3 through the outlet 3b. The suction head 3 further includes side walls 3c, extending from the lower end 3a to the outlet 3b. Preferably, the side walls 3c extend from the circumference of the lower end 3a to the outlet 3b. Together, the lower end 3a, outlet 3b and side walls 3c delimit the inside, or inner space, of the suction head 3. The central axis x-x' of the suction head 3 is indicated with a dash-dotted line in FIG. 1B. The lower end 3a may preferably be centred on the central axis x-x'. Preferably, the lower end 3a is perpendicular to the central axis x-x'. One configuration of the suction head 3 is shown in side-view cross-section in FIG. 1B and in bottom view in FIG. 1C.

The outlet 3b may be centred on the central axis x-x'. Alternatively, the outlet 3b may be oriented at an angle with respect to the central axis x-x'. Preferably, the outlet 3b is placed opposite the lower end 3a (FIG. 1B). Alternatively, the outlet may be placed on a side of the suction head 3. The surface area of the outlet 3b is preferably equal to, or less than, the surface area of the lower end 3b. Optionally, the outlet 3b may comprise a filter, for filtering the granular material entering the outlet 3b. The filter may be configured to block large particles, particle agglomerates and/or contaminating objects from entering the outlet and/or the tube. Advantageously, possible blockage of the outlet may thereby be avoided and downstream elements, such as pumps and control valves, may be protected. Additionally, particles above a certain particle diameter may be filtered from the granular material. Such filtering may be advantageous when a granular material of a given maximum particle size is required.

The suction head 3 comprises an inlet for the inflow of granular material into the suction head 3. The inlet may include a bottom inlet, positioned at the lower end 3a. The bottom inlet may include one or more openings. The bottom inlet may cover the entire lower end 3a. Alternatively, the bottom inlet may cover only a part of the lower end 3a. Alternatively, or additionally, the inlet may include one or more side inlets 3f, positioned at the side walls 3c. Advantageously, the one or more side inlets allow granular material to be offloaded from a larger area around the suction head. The one or more side inlets 3f combined extend over at least 2% of the circumference of the lower end 3a. Alternatively, the one or more side inlets 3f combined extend over 2-98%, preferably 5-70%, more preferably 15-60%, most preferably 20-50%, of the circumference of the lower end 3a. The one or more side inlets 3f combined comprise at least 2%, preferably at least 10%, more preferably at least 30%, most preferably at least 40%, of the total area for inflow of fluidized granular material into the suction head 3. For a suction head 3 with multiple inlets 3d, each side inlet 3d may extend over the same percentage, or over different percentages of the circumference. Each side inlet 3d may further extend from the lower end 3a of the suction head 3, up to at least 10%, preferably at least 20%, more preferably at least 30%, most preferably at least 40% of the height of the suction head 3. For a suction head 3 with multiple inlets 3d, each side inlet 3d may extend up to the same height, or up to different heights.

A suction head 3 with a bottom inlet and closed sides 3c is schematically shown in side-view in FIG. 1B and in bottom-view in FIG. 1C. An alternative suction head 3 with a bottom inlet and one or more side inlets 3f is schematically shown in bottom view in FIG. 1D. The bottom inlet and the one or more side inlets 3d may preferably form one connected inlet, as schematically shown in FIG. 1D. Further alternatively, the suction head 3 may comprise a closed lower end 3a and one or more side inlets 3f. This configuration may be advantageous when granular material must be removed from a given layer and preferably not from any layer(s) below. Optionally, a filter may be provided at the one or more side inlets 3f and/or the bottom inlet. The filter may serve the same purpose as the optional filter provided at the outlet 3b, described hereinbefore.

The suction head 3 may have a bell shape (see FIG. 1B), a dome shape, a cylindrical shape, a spiral shape, a cubic shape, a rectangular shape, a pyramidal shape, a semi-spherical shape, a conical shape, or any other suitable shape. The suction head 3 may comprise a metal material, such as aluminum or stainless steel, a polymer material, such as polypropylene or high-density polyethylene, or a composite material, such as a fiber-reinforced polymer. Optionally, the suction head 3 may be coated with a suitable coating, such as a wear resistant coating, an elastic coating, an anti-static coating, an anti-bacterial coating, an anti-fungal coating, an anti-magnetic coating, or an intumescent coating.

The at least one suction head 3 may be placed at a fixed position in the tank 1. Preferably, the at least one suction head 3 is placed in the middle of the tank 1. The suction head 3 may be mounted on a frame 1a (see FIG. 1A). The frame 1a may be suspended from the top of the tank 1, mounted on the bottom of the tank 1, or fixed to the side or sides of the tank 1. Advantageously, a simple and robust construction is thereby achieved, requiring little maintenance. Alternatively, the suction head 3 may be mobile and/or retractable. Thereto, the suction head 3 may be mounted on a moveable arm, such as a robotic arm. Preferably, the suction head 3 may then comprise one or more side openings 3f. Thereby, granular material may be sucked into the suction head 3 sideways, to prevent the suction head from getting immobilized in the granular material. Advantageously, improved operational flexibility is thereby achieved, allowing granular material to be offloaded from all areas of the tank.

The suction head 3 comprises one or more nozzles configured to emit a pressurized fluid. The one or more nozzles may comprise one or more inner nozzles 3d and/or one or more outer nozzles 3e. Solid arrows in FIG. 1B-1D schematically show outflow directions from selected inner nozzles 3d and selected outer nozzles 3e. The pressurized fluid emitted by the one or more nozzles fluidizes the granular material in the vicinity of the suction head, thereby improving the offloading of granular material by suction applied through the suction head. Further advantageously, the pressurized fluid may be utilized to clean the suction head and/or the tank, when the system is not in use for storage of granular material. The pressurized fluid may comprise a liquid, such as water, a gas, such as air, or a combination of a liquid and a gas. The inner nozzles 3d and/or the outer nozzles 3e may each comprise one or more nozzle openings. The one or more nozzle openings may be directed in the same direction or in different directions, but the nozzles are configured to generate a helical flow in one overall direction, either clockwise or anticlockwise. This will in many cases mean that the inner nozzles and the outer nozzles have a vector component representing the water flow in the same direction. Tests have shown that ensuring that the inner nozzles 3*d* and the outer nozzles 3*e* generate a helical flow in the same direction, ensures good fluidization without stirring up more solids than necessary, thus keeping the water surrounding the suction head relatively free from solids while ensuring a good transport of solids through the suction head.

Alternatively, the inner nozzles 3*d* and/or outer nozzles 3*e* may be formed as one or more slits. Advantageously, an even distribution of the outflow of pressurized fluid may thereby be achieved. Further advantageously, more fluid can be pumped through nozzles formed as slits, thereby achieving an improved fluidization of the granular material.

The inner nozzles 3*d* are mounted on the inside of the suction head 3, see FIG. 1B-1D. Preferably, the inner nozzles 3*d* are mounted on the side walls 3*c*. The inner nozzles 3*d* comprise at least one, preferably multiple inner nozzles 3*d*. The inner nozzles 3*d* are preferably configured to generate a helical flow within the suction head 3. Advantageously, the helical flow locally submits the granular material to a uniform rotation, thereby providing improved fluidization and offloading of granular material. The inner nozzles 3*d* may be distributed along one or more inner contour lines of the suction head 1, see FIG. 1C. The one or more inner contour lines may preferably be parallel inner contour lines. Alternatively, the one or more inner contour lines may be non-parallel or may cross one another. The inner nozzles 3*d* may be distributed symmetrically along the one or more inner contour lines. Advantageously, a symmetrical distribution of the inner nozzles results in a homogenous helical flow within the suction head. Alternatively, the inner nozzles 3*d* may be distributed non-symmetrically along the one or more inner contour lines. Advantageously, power to drive the emission of pressurized fluid from the inner nozzles is thereby only applied where needed.

In bottom view, the outflow direction of the inner nozzles 3*d* may be directed towards the center of the suction head, tangential to the side of the suction head, or away from the center of the suction head, see FIG. 1C. In sideview, the outflow direction of the inner nozzles 3*d* may be directed towards the plane of the lower end 3*a*, parallel to the plane of the lower end 3*a*, or away from the plane of the lower end 3*a*. The angle between the outflow direction of the one or more inner nozzles 3*d* and central axis x-x' (see FIG. 1B) may range from 0°-180°. At 0° the outflow direction points downwards, towards the lower end 3*a*. At 180° the outflow direction points upwards, away from the lower end 3*a*. Preferably, the angle ranges from 0°-90°, more preferably from 15°-75°, most preferably from 30°-60°. The outflow direction of the inner nozzles may be fixed. Alternatively, the outflow direction of each inner nozzle 3*d* may be adjustable by an adjustment mechanism. The adjustment mechanism may comprise an element to redirect the outflow from each inner nozzle 3*d*. Alternatively, the adjustment mechanism may comprise means to readjust the orientation of each inner nozzle 3*d*.

The outer nozzles 3*e* are mounted on the outside of the suction head 3, see FIG. 1B. Preferably, the outer nozzles 3*e* are mounted on the outside of the side walls 3*c*. The outer nozzles 3*e* comprise at least one, preferably multiple outer nozzles. The outer nozzles 3*e* are preferably configured to generate a helical flow around the suction head 3. The outer helical flow may have the same general flow direction as the inner helical flow. Advantageously, the outer helical flow submits the granular material around the suction head in a uniform rotation, thereby providing improved fluidization and offloading of granular material. The outer nozzles 3*e* may be distributed along one or more outer contour lines of the suction head 3. The one or more outer contour lines may preferably be parallel outer contour lines. Alternatively, the one or more outer contour lines may be non-parallel or may cross one another. The outer nozzles 3*e* may be distributed symmetrically along the one or more outer contour lines. Advantageously, a symmetrical distribution of the outer nozzles results in a homogenous helical flow around the suction head. Alternatively, the outer nozzles 3*e* may be distributed non-symmetrically along the one or more outer contour lines. Advantageously, power to drive the emission of pressurized fluid from the outer nozzles is thereby only used where needed.

In bottom view, the outflow direction of the outer nozzles 3*e* may be directed outward from the suction head 3, tangential to the suction head 3, or inward towards the suction head 3. In side-view, the outflow direction of the outer nozzles 3*e* may be directed toward the plane of the lower end 3*a*, tangential to the plane of the lower end 3*a*, or away from the plane of the lower end 3*a*. The angle between the outflow direction of the one or more outer nozzles 3*e* and central axis x-x' (see FIG. 1B) may range from 0°-180°. At 0° the outflow direction points downwards, towards the lower end 3*a*. At 180° the outflow direction points upwards, away from the lower end 3*a*. Preferably, the angle ranges from 0°-90°, more preferably from 15°-75°, most preferably from 30°-60°. Optionally, the angle between the outflow direction of each outer nozzle 3*e* and the plane of the lower end 3*a* may be adjustable by an adjustment mechanism. The adjustment mechanism may comprise an element to redirect the outflow from each outer nozzle 3*e* or may comprise means to readjust the orientation of each outer nozzle 3*e*. Advantageously, the pressurized fluid emitted from the outer nozzles fluidizes the granular material around the suction head, thereby improving offloading. Furthermore, the risk immobilization of a moveable suction head, by being sucked into the granular material, is reduced.

The system may further comprise one or more shearing elements. Advantageously, the one or more shearing elements may counteract cohesion between the particles of the granular material, thereby improving fluidization and subsequent offloading. The one or more shearing elements may be mounted on the at least one suction head 3. Additionally, or alternatively, the one or more shearing elements may be mounted on a separate arm, or on the bottom, the sides and/or the top of the tank 1. The one or more shearing elements may comprise passive shearing elements, such as teeth, blades, or knives. Alternatively, or additionally, the one or more shearing elements may comprise active shearing elements, such as rotating blades, vibrating elements, spiked rollers, or nozzles for emitting high-pressure fluid jets. The active shearing elements may be configured to be driven in a vibrating, a pulsating, and/or a rotating motion. Advantageously, such active shearing contributes to an improved local fluidization of the granular material during offloading. The shearing elements may be retractable shearing elements, such as retractable blades or fluid jets. Advantageously, the shearing elements can thereby be deployed only when needed.

The system comprises an outlet pipe 4 for offloading granular material from the tank 1. The outlet pipe 4 may be mounted at the upper part of the tank 1, at the lower part of the tank 1 or at the side of the tank 1. The outlet pipe 4 may comprise a rigid pipe, or a flexible pipe. One end of the outlet pipe 4 is coupled to the outlet 3*b* of the at least one suction head 3. The outlet pipe 4 may comprise a control valve 4a, for controlling the flow of granular material through the suction head 3 and the outlet pipe 4. The other end of the outlet pipe 4 may be coupled to a transport pipe, for transport of the offloaded granular material to a processing station, for further processing of the granular material, or to a receiving or a deposit location, for depositing the granular material. The transport pipe may comprise a rigid pipe. Alternatively, when the suction head 3 is mounted on a moveable arm, the transport pipe may comprise a flexible pipe. The system may further comprise a slurry pump 5, for pumping fluidized granular material from the tank 1. A slurry pump is configured to pump a mixture of a fluid and solid particles. The outlet pipe 4 may be connected to the slurry pump 5. Alternatively, the outlet pipe 4 may be configured to be connected to an external slurry pump (not shown), which is not part of the system. Additionally, the system may comprise a booster pump. A booster pump may, for instance, be required for a large tank or where suction must overcome strong inter-particle cohesion in the granular material.

The system may further comprise at least one pump 7, for pumping pressurized fluid to the one or more nozzles of the suction head 3. Alternatively, the system may be configured to be coupled to an external source of pressurized fluid, such as a pressurized water supply, a feed system for pressurized gas, or a fluid pressurized by upstream processing pressure. The system further comprises at least one conduit 8, connecting the at least one pump 7 or the external source of pressurized fluid to the nozzles of the at least one suction head 3. The conduit 8 may comprise a control valve 8a for controlling the flow of pressurized fluid through the conduit 8. The one or more suction heads 3 may be connected to the same pump 7. Alternatively, each suction head 3 may be connected to a separate pump 7.

The tank 1 may further comprise one or more secondary nozzles 9, located inside the tank 1. The one or more secondary nozzles 9 are configured to emit pressurized fluid. Preferably, the one or more secondary nozzles 9 are configured to generate a helical flow within the tank 1. Thereby the one or more secondary nozzles improve local fluidization and/or transport of the granular material. Furthermore, pressurized fluid emitted from the secondary nozzles 9 may contribute to building up overpressure in the tank 1, thereby driving offloading of granular material through the suction head 3. The one or more secondary nozzles 9 are connected to the at least one pump 7 or configured to be connected to the external source for pressurized fluid, by the at least one conduit 8. The one or more secondary nozzles 9 may be located at the lower part of the tank 1, see FIG. 1A. Advantageously, pressurized fluid emitted from the one or more secondary nozzles drives and/or improves offloading of granular material below the suction head. Additionally, or alternatively, the one or more secondary nozzles may be located at the sides of the tank 1 and/or at the upper part of the tank 1. Advantageously, the surface of the granular material in the tank 1 may thereby be fluidized and prevented from drying out and forming strong cohesive inter-particle bonds. The outflow direction of the one or more secondary nozzles 9 may be fixed or may be adjustable. Further advantageously, when the tank is empty, pressurized fluid emitted from the one or more secondary nozzles may be utilized to clean the inside of the tank.

The system may comprise one or more overflow outlets 10, for allowing fluid to flow from the tank 1. The one or more overflow outlets 10 may be located at the upper part, at the sides, and/or at the lower part of the tank 1. Further advantageously, by allowing fluid to flow out of the tank, over-filling of the tank may be prevented. Each of the one or more overflow outlets 10 may comprise a control valve 10a, for controlling the flow of fluid through the one or more overflow outlets 10. The one or more overflow outlets 10 may be connected to a pump or a compressor. The one or more overflow outlets 10 may further comprise a filter, for filtering out particles from the fluid flowing through the overflow outlet 10. Advantageously, fluid may flow out of the tank through the one or more overflow outlets, while granular material remains in the tank. Thereby, the granular material may be compacted, and the volume of the granular material stored in the tank may be increased. The one or more secondary nozzles 9 may be directed to generate a helical flow inside the tank 1 in the same direction as nozzles on the suction head 3.

Flow within and around the at least one suction head 3 is schematically shown in side-view in FIG. 1E. In operation, pressurized fluid is driven by the at least one pump 7, or by the external source of pressurized fluid, through the conduit 8 to the inner nozzles 3d and outer nozzles 3e. Solid arrows in FIG. 1B-1D schematically show outflow of pressurized fluid from some inner and outer nozzles. The outflow of pressurized fluid from the inner nozzles 3d may generate a helical flow within the at least one suction head 3 (black striped arrows in FIG. 1E). The outflow of pressurized fluid from the outer nozzles 3e may generate a helical flow around the suction head 3 (grey striped arrow in FIG. 1E). The outer helical flow may have the same general flow direction as the inner helical flow. Alternatively, the outer helical flow may have the opposite general flow direction as the inner helical flow. Advantageously, the helical flows locally generate a rotational flow and fluidization in the granular material. The fluidized granular material is then sucked into the at least one suction head 3 and into the outlet pipe 4, schematically shown by grey solid arrows in FIG. 1E. Advantageously, the helical flows facilitate an improved offloading of the granular material. Furthermore, fluidization in the vicinity of the suction head prevents the suction head from becoming immobilized in the granular material.

Alternative tank configurations are shown in FIG. 2A and FIG. 2B. The tank 1 may comprise a cylindrical tank, which may be horizontally oriented, see FIG. 2A. Advantageously, a horizontally oriented cylindrical tank may easily be placed on a transport means, such as a lorry, a railway wagon, or a vessel. The system comprises at least one suction head 3, preferably at least two suction heads 3, more preferably at least three suction heads 3. If at least two suction heads 3 are provided, the at least two suction heads 3 may preferably be positioned parallel to the longitudinal axis of the tank 1. When two or more suction heads 3 are provided, the system may comprise two or more outlets 4, each coupled to one or more different suction heads 3. Advantageously, by providing multiple suction heads granular material can be removed effectively along the entire length of the tank. The risk of dead spaces, where suction fails to remove granular material is thereby minimized.

The cylindrical tank 1 may comprise a bottom with a V-shaped, U-shaped, or a semi-circular lengthwise cross-section, shown in FIG. 2B. Thereby, the height in the middle of the tank 1 is larger than the height at the sides of the tank 1. One or more suction heads 3 may preferably be positioned such that the lower end 3a of these suction heads is locally parallel, or substantially parallel, to the bottom of the tank 1. Advantageously, the suction applied through the suction heads is thereby distributed uniformly over the bottom of the tank. Alternatively, one suction head 3 may be placed lengthwise in the middle of the tank 1. Advantageously, granular material collected in the middle of the tank under the influence of gravity can thereby easily be removed.

The system may comprise two or more tanks 1, coupled lengthwise or widthwise. Several systems according to the invention may be coupled in series. A processing plant comprising one or more systems according to the invention may be configured to perform an industrial process, such as a chemical process, a pharmaceutical process, an agricultural process, a food production process, an oil or gas production operation, a dredging operation, an excavation operation, or a mining operation. The one or more systems of the processing plant may be coupled. The system may, for instance, comprise a multiphase separator, a solids accumulator, an upstream multiphase scrubber, or a monoethylene glycol recovery unit for oil and gas processing.

Details of alternative flow configurations are shown in FIG. 3A-3C. In a first alternative flow configuration, see FIG. 3A, the at least one conduit 8 may comprise an inner conduit 8' and an outer conduit 8". The inner conduit 8' may connect the conduit 8 to the inner nozzles 3d. Preferably, the inner conduit 8' comprises a control valve 8a'. The outer conduit 8" may connect the at least one conduit 8 to the outer nozzles 3e. Preferably, the outer conduit 8" comprises a control valve 8a". Advantageously, the flow of pressurized fluid from the at least one pump 7, or the external pressurizing system, to the inner nozzles and from the pump to the outer nozzles may thereby be individually controlled. Thereby, the helical flow within the suction head and the helical flow around the suction head may be controlled depending on requirements, such as the characteristics of the granular material, or the shape of the tank.

In a second alternative flow configuration, see FIG. 3B, the system may comprise an eductor 6a, instead of, or in addition to a slurry pump. The eductor 6a is configured to generate suction based on the venturi principle. The eductor 6a is connected to the outlet pipe 4. The eductor 6a is further connected to the at least one pump 7, or to the external source of pressurized fluid, by an eductor conduit 11. The eductor conduit 11 may comprise a control valve 11a, for controlling the flow of pressurized fluid to the eductor 6a. In operation, flow through the eductor 6a is driven by pressurized fluid from the pump 7. A venturi effect arises in the eductor 6a, thereby generating suction in the outlet pipe 4 and the suction head 3. Advantageously, this configuration utilizes a single source of pressurized fluid to drive both fluidization and suction, achieving a more robust system. In this configuration the system may comprise one conduit 8 connecting the at least one pump 7, or the external source of pressurized fluid, to the inner nozzles 3d and/or the outer nozzles 3e, see FIG. 3B. Alternatively, the system may comprise an inner conduit connecting the at least one pump 7, or the external source of pressurized fluid, to the inner nozzles 3d and an outer conduit connecting the pump 6 to the outer nozzles 3e.

In a third alternative flow configuration, see FIG. 3C, the system comprises a compressor 6b. The compressor 6b is connected to the outlet pipe 4 by a compressor conduit 12. The compressor conduit 12 may comprise a valve 12a to control the flow through the compressor conduit 12. In operation, pressurized gas, such as air, is pumped by the compressor 6b to the outlet pipe 4, thereby generating gas lift. The gas lift generates a pressure difference over the outlet pipe 4, thereby generating suction in the suction head 3. Granular material is sucked into the outlet pipe 4 and mixed with compressed gas. Advantageously, the fluidized granular material does not pass through a pump or other restrictions when being transported away from the suction head, thereby reducing the risk of obstructions by the jamming of granular material. Optionally, the suction means may additionally comprise a slurry pump (not shown), connected to the outlet pipe 4. In this configuration the system may comprise one conduit 8 connecting the at least one pump 7, or the external source of pressurized fluid, to the inner nozzles 3d and/or the outer nozzles 3e, see FIG. 3C. Alternatively, the system may comprise an inner conduit connecting the at least one pump 7, or the external source of pressurized fluid, to the inner nozzles 3d and an outer conduit connecting the at least one pump 7, or the external source of pressurized fluid, to the outer nozzles 3e.

Alternatively, or in addition to each of the flow configurations described above, offloading may be driven by overpressure. Pressure in the tank 1 may be higher than the pressure at the receiving end of the outlet pipe 4. The resulting overpressure consequently pushes the fluidized granular material out of the tank, through the outlet pipe 4, thereby offloading the granular material from the system. The flow of fluidized granular material through the outlet pipe 4 may be controlled by the control valve 4a. The overpressure in the tank 1 may be driven by the processing system pressure, the at least one pump 7, by the external source of pressurized fluid, or by an additional pump or compressor.

The system may further comprise sensor means, such as one or more cameras, pressure sensors, temperature sensors, level sensors, weight sensors and/or conductivity sensors. One or more sensor means may be placed on or within the suction head 3. The system may further comprise communication means, such as one or more wireless transceivers. The system may also comprise control means, such as a CPU, a memory, and a monitor, for control of the system. The control means may allow an operator to control movement of a robotic arm on which the suction head 3 is mounted. The control means may also be configured to regulate the volume and/or the weight of the granular material in the tank 1, the volume and/or the pressure of the pressurized fluid in the tank 1, the at least one pump 7, the compressor 6b, the eductor 6a, the slurry pump, the one or more control valves of the system, and/or the outflow direction of the inner nozzles 3d and/or the outer nozzles 3e. Optionally, the system may comprise steering means, such as a joystick or control levers, for remote operation and steering of a robotic arm on which the suction head 3 is mounted. Advantageously, the suction head may therewith be precisely controlled to ensure granular material removal from the tank.

A method for temporary storage and offloading of granular materials comprises providing a system according to the invention. A granular material is then supplied to the storage tank 1. The granular material may be temporarily stored in the tank 1 during transport, production, or processing of the granular material. The granular material may originate from any industrial process, such as a chemical process, a pharmaceutical process, an agricultural process, a food production process, an oil or gas production operation, a dredging operation, an excavation operation, or a mining operation. The particles of the granular material may comprise an organic or inorganic material. The granular material may comprise gravel, sand, silt, clay, minerals, polymers, metals, ceramics, or composites, processed food or raw food materials, pharmaceutical materials, biomass, wood, crystalline materials, or combinations thereof. The particles may have a diameter from less than one micron up to several centimeters or more.

To fluidize granular material in the tank 1 pressurized fluid is emitted from the inner nozzles 3*d* and/or the outer nozzles 3*e*. Additionally, the one or more secondary nozzles 9 may emit a pressurized fluid, to fluidize the granular material. The pressurized fluid may comprise a gas, such as air. A gas may be preferable for perishable granular materials, such as starch, corn, rice, or pharmaceutical materials. Advantageously, when utilizing pressurized air, perishable granular materials may be dried by the pressurized air emitted from the nozzles in the tank. Further advantageously, the air pressure may be chosen to separate high-density contaminating particles, such as sand or dirt, from the perishable product in the tank. Alternatively, the pressurized fluid may comprise a liquid, such as water. A liquid may be preferably for high-density or strongly cohesive granular materials, such as sand or gravel. The liquid may comprise additives, such as a solvent, a surfactant, an anti-coagulating agent, a viscosity modifier, or combinations thereof. The pressurized fluid may fluidize the granular material locally, in the vicinity of the suction head 3, or in the entire tank 1. The fluidized granular material is then offloaded through the at least one suction head 3. The offloading of fluidized granular material from the tank 1 may be driven by suction, applied through the suction head 3. As described hereinbefore, suction may be applied to the suction head 3 by the slurry pump 5, the eductor 6*a*, or the compressor 6*b*. Alternatively, or additionally, offloading of the fluidized granular material from the tank 1 may be driven by overpressure applied to in the tank 1. Overpressure may be driven by the (processing) system pressure, the at least one pump 7, by an external pressurizing system, or by an additional pump or compressor.

From the suction head 3, the granular material is transported through the outlet pipe 4 and optionally through the transport pipe. The granular material may then be deposited at a different remote location, such as a receiving or deposit location, a further temporary storage, or a processing station. The method may further comprise emitting pressurized fluid from the inner nozzles 3*d*, the outer nozzles 3*e* and/or the secondary nozzles 9 to clean the tank 1 after offloading the granular material from the tank 1.

LIST OF REFERENCES

1 tank
1*a* frame
2 supply pipe
2*a* control valve
3 suction head
3*a* lower end
3*b* outlet
3*c* side wall
3*d* inner nozzle
3*e* outer nozzle
3*f* side inlet
4 outlet pipe
4*a* control valve
5 slurry pump
6*a* eductor
6*b* compressor
7 pump
8 conduit
8*a* control valve
8' inner conduit
8*a*' control valve
8" outer conduit
8*a*" control valve

9 secondary nozzle
10 overflow outlet
10*a* control valve
11 eductor conduit
11*a* control valve
12 compressor conduit
12*a* control valve

The invention claimed is:

1. A system for temporary storage and offloading of granular materials, the system comprising:
   a tank for storage of a granular material;
   an outlet pipe for offloading granular material from the tank;
   a suction head for offloading granular material from the tank;
   the suction head including an inside delimited by a lower end, an outlet for removing granular material from the suction head coupled to an end of the outlet pipe and sidewalls, extending from the lower end to the outlet;
      an inlet for the inflow of granular material into the suction head;
      one or more inner nozzles placed on an inside of the sidewalls and configured to emit a pressurized liquid, and to generate a helical flow within the suction head;
      one or more outer nozzles placed on an outside of the sidewalls and configured to generate a helical flow around the suction head; and
      wherein the one or more inner nozzles, are configured to generate a helical flow in the same direction as the one or more outer nozzles.

2. The system of claim 1, wherein the inlet comprises one or more side inlets, positioned at the side walls.

3. The system of claim 2, comprising two or more side inlets, wherein the two or more side inlets are distributed symmetrically, or asymmetrically, over the circumference of the lower end.

4. The system of claim 1, wherein the lower end is closed.

5. The system of claim 1, wherein the lower end comprises a bottom inlet for the inflow of granular material into the suction head.

6. The system of claim 1, wherein the tank comprises one or more secondary nozzles located inside the tank, at the lower part of the tank, at the sides of the tank, and/or at the upper part of the tank.

7. The system of claim 6, wherein the outflow direction of the one or more nozzles and/or the one or more secondary nozzles is adjustable.

8. The system of claim 6, wherein the outflow direction of the one or more secondary nozzles, the outflow direction of the one or more inner nozzles, and the outflow direction of the one or more outer nozzles are configured to generate a helical flow around the suction head in the same direction.

9. The system of claim 1, wherein the one or more nozzles comprise one or more slits.

10. The system of claim 1, further comprising a slurry pump, configured to apply suction to the suction head.

11. The system of claim 1, further comprising an eductor, configured to apply suction to the suction head.

12. The system of any of claim 11, wherein the eductor is connected to the at least one pump, or wherein the eductor is configured to be connected to an external pressurizing system, to apply suction to the suction head.

13. The system of claim 1, further comprising a compressor, configured to generate gas lift in the outlet and to thereby apply suction to the suction head.

14. The system of claim 1, further comprising an additional pump or compressor, configured to pressurize the granular material in the tank to drive offloading through the suction head.

15. The system of claim 1, wherein the longitudinal axis of the tank is oriented at an angle of 0-90° with respect to surface on which the tank is mounted.

16. The system of claim 1, wherein the tank comprises a flat bottom, a conical bottom, a semi-spherical bottom, a semi-cylindrical bottom, or a V-shaped bottom.

17. The system of claim 1, wherein the suction head is placed at a fixed position, or wherein the suction head is mobile and/or retractable.

18. The system of claim 1, comprising at least two suction heads, positioned parallel to the longitudinal axis of the tank.

19. The system of claim 1, wherein the tank is mounted on a fixed frame, or mounted on a movable structure, and wherein the movable structure may be a lorry, a railway wagon, or a vessel.

20. A processing plant comprising at least one system according to claim 1.

21. Transport means including at least one of a lorry, a railway carriage, or a vessel, comprising a system according to claim 1.

22. A method for storage and offloading of granular materials, the method comprising:

providing a system according to claim 1;

supplying a granular material to the tank;

emitting pressurized liquid from the one or more nozzles to fluidize granular material in the tank; and offloading fluidized granular material through the suction head.

23. The method of claim 22, wherein offloading of fluidized granular material is driven by suction applied through the suction head.

24. The method of claim 23, wherein suction is applied by a slurry pump, by an eductor, or by a compressor.

25. The method of claim 22, wherein offloading of fluidized granular material is driven by overpressure in the tank.

26. The method of claim 25, wherein the overpressure is driven by the at least one pump, by an external pressurizing system, by system pressure, or by an additional pump or compressor.

27. The method of claim 22, wherein the granular material comprises gravel, sand, silt, clay, minerals, glass, polymers, metals, ceramics, composites, food materials, pharmaceutical materials, biomass, wood, crystalline materials, or combinations thereof.

* * * * *